United States Patent [19]
Neal et al.

[11] Patent Number: 5,383,955
[45] Date of Patent: Jan. 24, 1995

[54] NITROGEN OXIDES AND SULFUR OXIDES REMOVAL UTILIZING TRANSPORT LINE ADSORBER

[75] Inventors: Lewis G. Neal, Bethel Park; Warren Ma, Pittsburgh; Min-Yan Chang; Qian Zhou, both of Bethel Park, all of Pa.; Carmo J. Pereira, Silver Spring, Md.; Karl W. Plumlee, Elliocott City, Md.; Jean W. Beeckman, Columbia, Md.

[73] Assignee: Noxso Corporation, Bethel Park, Pa.

[21] Appl. No.: 166,203

[22] Filed: Dec. 13, 1993

Related U.S. Application Data

[63] Continuation-in-part of Ser. No. 17,864, Feb. 16, 1993, Pat. No. 5,302,188, which is a continuation of Ser. No. 801,697, Dec. 2, 1991, abandoned.

[51] Int. Cl.$^6$ .............................................. B01D 53/12
[52] U.S. Cl. .......................................... 95/34; 95/109; 95/115; 95/129; 95/137; 95/269; 96/123; 96/128; 96/130; 96/146; 96/150; 55/267; 55/338; 55/345
[58] Field of Search ................... 95/34, 109, 115, 129, 95/137, 148, 269, 288; 422/178; 423/244.01; 96/123, 126–128, 130, 143–146, 150; 55/267–269, 338, 345

[56] References Cited

U.S. PATENT DOCUMENTS

| | | | |
|---|---|---|---|
| 2,397,566 | 4/1946 | Schutte | 55/390 X |
| 2,992,065 | 7/1961 | Feustel et al. | 55/79 X |
| 3,563,704 | 2/1971 | Torrence | 55/73 |
| 3,727,376 | 4/1973 | Szirmay | 55/79 X |
| 3,960,529 | 6/1976 | Juntgen et al. | 55/390 |
| 3,966,879 | 6/1976 | Goenendaal et al. | 55/73 X |
| 3,976,446 | 8/1976 | Sims | 55/73 |
| 4,004,885 | 1/1977 | Groenendaal et al. | 55/390 X |
| 4,215,101 | 7/1980 | Kriegel et al. | 55/79 X |
| 4,302,221 | 11/1981 | Tanaka | 55/73 X |
| 4,609,539 | 9/1986 | Horecky et al. | 55/73 X |
| 4,612,177 | 9/1986 | Kretchmer et al. | 55/73 X |
| 4,692,318 | 9/1987 | Tolpin et al. | 55/73 X |
| 4,755,499 | 7/1988 | Neal et al. | 502/415 |
| 4,798,711 | 1/1989 | Neal et al. | 423/239 |
| 4,881,476 | 11/1989 | Becker et al. | 110/347 |
| 4,917,875 | 4/1990 | Moore et al. | 55/73 |
| 4,940,569 | 7/1990 | Neal et al. | 55/77 |
| 5,302,188 | 4/1994 | Neal et al. | 95/34 |

Primary Examiner—Robert Spitzer
Attorney, Agent, or Firm—R. Gale Rhodes, Jr.

[57] ABSTRACT

Removal $NO_x$ and $SO_x$ from the flue gas utilizing a transport line adsorber through which sorbent is transported by pressurized flue gas to cause the sorbent to absorb $NO_x$ and $SO_x$ from the flue gas while the flue gas is transporting the sorbent particles through the transport line adsorber. A plurality of interconnected cyclones may be utilized to contact sorbent saturated with $NO_x$ and $SO_x$ removed from the flue gas with a heated gas to heat the sorbent and remove the $NO_x$ from the sorbent and separate the sorbent and the heated gas to produce an off stream of heated gas carrying the removed $NO_x$ away; the heated gas and gravity combine to pass the sorbent through the plurality of cyclones and which cyclones are positioned vertically and successively downwardly with respect to each other. A plurality of interconnected cyclones is also utilized to contact heated sorbent having the $NO_x$ and $SO_x$ removed therefrom with a cooling gas to cool the sorbent and separate the sorbent from the cooling gas to produce cooled regenerated sorbent for recycling and repeating of the $NO_x$ and $SO_x$ flue gas removal.

22 Claims, 7 Drawing Sheets

NITROGEN OXIDES AND SULFUR OXIDES REMOVAL UTILIZING TRANSPORT LINE ADSORBER

CROSS-REFERENCE TO RELATED APPLICATIONS

This application is a continuation-in-part of pending U.S. patent application Ser. No. 08/017,864, filed Feb. 16, 1993 now U.S. Pat. No. 5,302,188, issued Apr. 12, 1994, entitled Nitrogen Oxides and Sulfur Oxides Removal Utilizing Transport Line Adsorber, Lewis G. Neal and Warren Ma inventors, assigned to the same assignee as this application, which application Ser. No. 08/017,864 is a continuation of abandoned U.S. patent application Ser. No. 07/801,697, filed Dec. 2, 1991 now abandoned, entitled Nitrogen Oxides and Sulfur Oxides Removal Utilizing Transport Line Adsorber, Lewis G. Neal and Warren Ma inventors, assigned to the same assignee as this application.

BACKGROUND OF THE INVENTION

This invention is an improvement in the apparatus and process disclosed in U.S. Pat. No. 4,798,711 entitled PROCESSES FOR REMOVING NITROGEN OXIDES, SULFUR OXIDES AND HYDROGEN SULFIDE FROM GAS STREAMS, issued Jan. 17, 1989, Lewis G. Neal, et al. inventors, and assigned to the same assignee as the present invention. This prior art process is referred to in the art as the NOXSO Process. The NOXSO Process is illustrated in FIG. 1 wherein there is shown a flue gas stream, 12 containing both nitrogen oxides or $NO_x$ (NO and $NO_2$ OR $N_2O_4$) and sulfur oxides or $SO_x$ ($SO_2$ and $SO_3$) from, for example, a coal-fired or oil-fired power plant (not shown) which flue gas stream is passed through a fluid bed adsorber 14 containing suitable sorbent particles or beads, such as, for example, those disclosed in U.S. Pat. No. 4,755,499 entitled SORBENT FOR REMOVING NITROGEN OXIDES, SULFUR OXIDES AND HYDROGEN SULFIDE FROM GAS STREAMS, issued Jul. 5, 1988, Lewis G. Neal, et al., inventors, and assigned to the same assignee as the present invention. Adsorber 14 has a fluidizing grid 15. The sulfur oxides and nitrogen oxides are adsorbed on the surfaces of the sorbent particles and removed from the flue gas stream. The two above-identified patents are hereby incorporated herein by reference as if fully reproduced herein.

The saturated sorbent particles 16, i.e. sorbent particles having adsorbed the $NO_x$ and $SO_x$ from the flue gas, is subsequently transported to a staged, fluid bed heater 18 wherein the sorbent particles temperature is raised above 532° C. (1000° F.) using high temperature air 20 supplied by air heater 22 into which air heater a stream of ambient air 24 and a suitable fuel stream 26, e.g., natural gas, enter. The sorbed $NO_x$ is removed or stripped from the sorbent particles and carried away in the hot gas stream which passes through cyclone 28 and via stream 30 is mixed with the power plant combustion air stream (not shown).

The hot sorbent particles with the $NO_x$ removed therefrom is transferred from the sorbent heater 18 into a moving bed regenerator 32 via line 34. In the moving bed regenerator 32, the sorbent particles are contacted with a suitable regenerant gas stream 36. The regenerant gas 36 reacts with the $SO_x$ adsorbed by the sorbent particles to produce elemental sulfur. Off-gas stream 38 containing elemental sulfur is transported into a sulfur condenser and mist eliminator 45 wherein a steam stream 42, water stream 44 and elemental sulfur stream 46 are produced. A stream 40 from the sulfur condenser and mist eliminator 45 is returned to regenerator 32.

The regenerated sorbent particles, i.e. sorbent particles with the $SO_x$ and $NO_x$ removed, is transported via stream 48 past valve 50 to a staged, fluid bed sorbent cooler 52, where it is contacted with atmospheric air supplied via line 54 to reduce its temperature to about 120° C. (250° F.). The heated atmospheric air 56 subsequently is transported to gas heater 22 where its temperature is increased well above 532° C. (1000° F.) for use as the heated medium in fluid bed heater 18.

Cooled regenerated sorbent particles via line 58 is transported via line 58 by air in line 54 to a pneumatic lift line 60 and into a cyclone separator 62 via stream 64. Cyclone separator 62 separates stream 64 into a stream of air 66 and a stream of regenerated sorbent particles 68. Regenerated sorbent stream 68 enters the fluid bed adsorber 14. The discharge gas from adsorber 14 exits via line 70.

In brief summary, it will be understood that the $SO_x$ and $NO_x$ are removed from the flue gas stream 12 by the fluid bed adsorber 14 to produce a stream of $NO_x$ and $SO_x$ free flue gas 70 and thereafter the fluid bed heater 18, moving bed regenerator 32 and fluid bed sorbent cooler 52 regenerate the sorbent particles which adsorbed the $SO_x$ and $NO_x$ in the fluid bed adsorber 14 whereafter the regenerated sorbent particles are transported via line 58 to the pneumatic lift line 60 for return through the cyclone separator 62 to the fluid bed adsorber 14 where the NOXSO Process is repeated.

The above-described NOXSO Process has been found to be highly efficient in the removal of $SO_x$ and $NO_x$ from flue gas and since the sorbent particles or beads utilized are relatively large, approximately 10 mesh (2,000 microns) to 20 mesh (850 microns) (note incorporated U.S. Pat. No. 4,755,499, Col. 8, line 8), the process has the advantage that the sorbent particle or bead size is large relative to fly ash particles typically found in flue gas and therefore such sorbent beads or particles are easily distinguished from the fly ash and easily separated therefrom. A further advantage is that due to the relatively large size (approximately 10 to 20 mesh) the sorbent particles or beads have a relatively large mass which means they have a relatively high terminal velocity which substantially precludes the sorbent particles or beads from leaving the fluid or fluidized state and escaping from the fluid bed heater 18 and fluid bed cooler 52 with the exiting gases and being lost; the terminal velocity is the velocity at which the sorbent particles or beads in a fluid bed cease being in the fluid or fluidized state and escape from the fluid bed and become subject to entrainment into gas exiting the fluid bed and loss. However, the above-described NOXSO Process has some disadvantage in that the relatively large size sorbent particles or beads (approximately 10 to 20 mesh) are relatively expensive to make, the adsorption rate is diffusion controlled and therefore relatively slow, the sorbent particles or beads are porous (note for example the micropores and macropores of the sorbent particles shown in FIG. 7 of the patents incorporated above by reference) and the center portions of such beads or particles tend not to be completely used in $SO_x$ and $NO_x$ adsorption, the relatively large beads with the relatively large mass tend to break and attrite when they impact a solid surface at a relatively high velocity, and since the apparatus used to practice the process illustrated in FIG. 1 is essentially a gravity feed process, the sorbent particles or beads upon adsorbing the $SO_x$ and $NO_x$ are at the top of the apparatus and the regenerated beads, due to the gravity flow utilized, are present at the bottom of the apparatus requiring that they be lifted back up to the top of the apparatus, such as by the pneumatic lift line 60 in FIG. 1, for recycling. These relatively large sorbent particles (approximately 10 to 20 mesh) require a relatively high gas velocity to carry them through the lift line 60.

It has been found that sorbent particles or beads of a comparatively or relatively small size, approximately 30 to 500 microns, have the following comparative advantages vis-a-vis above-noted relatively large sorbent beads or particles. The smaller size sorbent beads or particles adsorb the $SO_x$ and $NO_x$ more rapidly and are able to remove a greater amount of such oxides from the flue gas, because the process is chemically, not diffusion, controlled (see FIG. 2 where the $NO_x$ removal rate versus sorbent particle size is shown and see FIG. 8 where the sulfur content by percent weight after adsorption is compared with sulfur content of sorbent particles of various sizes from 0 to 2500 microns, respectively; the sulfur carrying or adsorbing capacity for sorbent particles of about 500 microns particle size is about 40% greater than for the sorbent particles of 1,500 microns particle size), the relatively small size sorbent beads or particles are easier to make and therefore less expensive which in turn makes the $SO_x$ and $NO_x$ removal process less expensive, and it has been found or discovered that due to the relatively smaller mass of the relatively smaller sorbent beads or particles, the apparatus for lifting the regenerated beads to the top of the apparatus used to practice the NOXSO Process, such as the above-noted pneumatic lift line 60 in FIG. 1, can be utilized as both a vehicle or entrained flow absorber for lifting the regenerated sorbent particles back up to the top of the apparatus and a vehicle for containing the sorbent particles or beads while they are adsorbing $NO_x$ and $SO_x$ from the flue gas.

Further, as known to those skilled in the fluid bed art and as noted above, solid particles such as the present sorbent particles or beads, have a fluidization velocity and a terminal velocity. The fluidization velocity is the velocity at which the sorbent particles or beads become fluidized, i.e. moves in a fluid state under the influence of a pressurized gas and the terminal velocity is the velocity at which the beads escape from the fluid state and from the fluid bed. While the above-noted relatively large sorbent beads or particles (approximately 850 to 2,000 microns) due to their relatively large size and therefore relatively large mass have a relatively high terminal velocity and hence remain in the fluidized state when subjected, for example, to conditions in the fluid bed heater 18 and fluid bed cooler of FIG. 1 in the NOXSO Process, it has been found that the relatively small sorbent beads or particles (approximately 30 to 500 microns) have a relatively low terminal velocity and therefore have the tendency to escape from the fluidized state and be lost when utilized in apparatus such as the fluid bed heater 18 and fluid bed cooler 52 of FIG. 1.

In view of the foregoing, it will be understood that there exists a need in the flue gas $SO_x$ and $NO_x$ removal art of new and improved process and apparatus which utilizes the above-noted relatively small sorbent beads or particles (approximately 30 to 500 microns) and which permits the function of the pneumatic lift line 60 and fluid bed adsorber 14 of FIG. 1 to be combined in a single apparatus or process step, and further that there exists a need for new and improved apparatus and process for contacting the saturated sorbent particles with a heating gas to heat the saturated sorbent particles and remove the $NO_x$ therefrom and for contacting the heated sorbent particles with a cooling gas after $NO_x$ and $SO_x$ removal therefrom to cool the sorbent particles and produce cooled regenerated sorbent particles for continuous repeating of the $NO_x$ and $SO_x$ removal process.

SUMMARY OF THE INVENTION

It is the object of the present invention to satisfy the foregoing needs in the $NO_x$ and $SO_x$ removal art.

Apparatus and process satisfying such needs and embodying the present invention utilize an entrained flow adsorber such as a transport line adsorber through which sorbent particles are transported by being entrained in the pressurized flue gas to cause the sorbent to adsorb $NO_x$ and $SO_x$ from the flue gas while the flue gas is transporting the sorbent particles through the transport line adsorber. In a further embodiment, a plurality of interconnected cyclones may be utilized to contact sorbent particles saturated with $NO_x$ and $SO_x$ removed from the flue gas with a heated gas to heat the sorbent particles and remove the $NO_x$ from the sorbent particles and separate the sorbent particles and the heated gas to produce an off stream of heated gas carrying the removed $NO_x$ away; the heated gas and gravity combine to pass the sorbent particles through the plurality of cyclones which cyclones are positioned vertically and successively downwardly with respect to each other. In a still further embodiment, a plurality of interconnected cyclones is utilized to contact heated sorbent particles having the $NO_x$ and $SO_x$ removed therefrom with a cooling gas to cool the sorbent particles and separate the sorbent particles from the cooling gas to produce cooled regenerated sorbent particles for recycling and repeating of the $NO_x$ and $SO_x$ flue gas removal.

DESCRIPTION OF THE INVENTION

Figure 3:
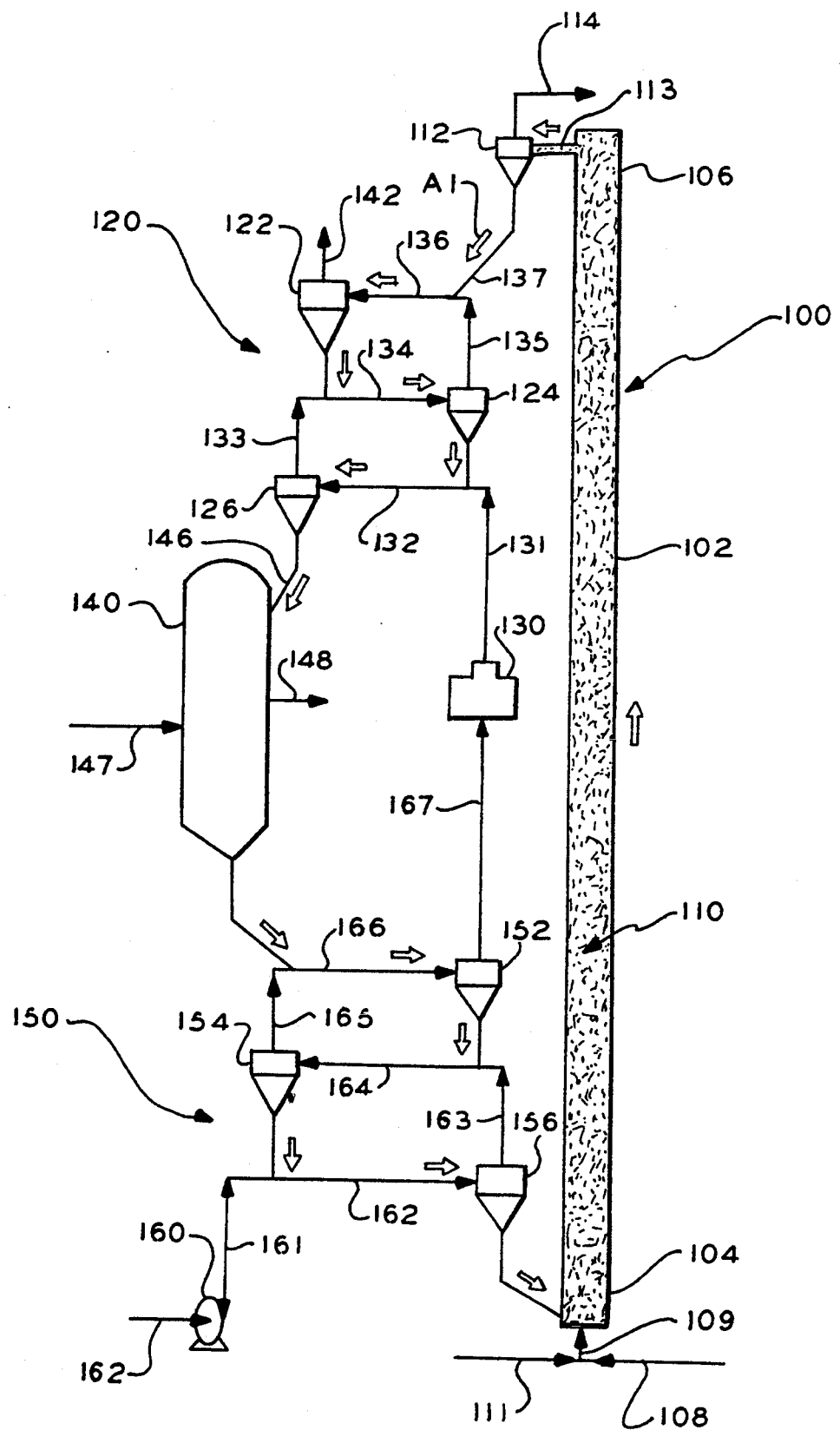
FIG. 3 is a diagrammatical illustration of an embodiment of the improved apparatus and process of the present invention for removing $NO_x$ and $SO_x$ from flue gas and which embodiment uses a transport line, or entrained flow, adsorber and pluralities of interconnected cyclones.

Referring now to FIG. 3, apparatus embodying the present invention is illustrated diagrammatically and indicated by general numerical designation 100; apparatus 100 is particularly useful for practicing the process of the present invention. Apparatus 100 includes a hollow, generally cylindrical and generally vertically oriented transport line adsorber 102 having a bottom portion 104 and a top portion 106; the transport line adsorber in accordance with the present invention is one embodiment of an entrained flow adsorber in which the sorbent particles are transported to an elevated position for regeneration by being entrained in the pressurized flue gas flowing upwardly through the adsorber while the particles are simultaneously adsorbing nitrogen oxides and sulfur oxides from the pressurized flue gas. Suitable sorbent particles for adsorbing nitrogen oxides and sulfur oxides from flue gas containing such oxides are utilized and indicated by general numerical designation 110. Sorbent particles 110 will have a size in the range of about 30 to about 500 microns, preferably about 30 to about 250 microns, and more preferably about 50 to about 150 microns, and may be, for example, sorbent particles of the general type disclosed in the above-identified patents incorporated herein by reference. Pressurized flue gas indicated by arrow 108 may be, for example, from a coal-fired or an oil-fired power plant (not shown), or from any other source emitting an effluent gas containing nitrogen oxides and sulfur oxides. The bottom portion 104 of the transport line adsorber 102 is provided with an input indicated by arrow 109 through which may be introduced the pressurized flue gas as indicated by the arrow 108 and through which may be introduced the sorbent particles 110 as indicated by the arrow 111. The input 109 may be a single input through which both the sorbent particles and the pressurized flue gas are introduced or the input 109 may be two inputs one for introducing the pressurized flue gas and one for introducing the sorbent particles.

It will be generally understood that the sorbent particles 110 are transported upwardly through the transport line adsorber 102 by being entrained in the pressurized flue gas 108 and that as the sorbent particles are being so transported they adsorb the nitrogen oxides and the sulfur oxides contained in the flue gas 108. The top portion 106 of the transport line adsorber 102 may be provided with an output 113 through which the pressurized flue gas and the sorbent particles having the nitrogen oxides and sulfur oxides adsorbed thereto may exit the transport line adsorber 102.

The height or length of the transport line 102 is chosen to provide the sorbent particles 110 with sufficient residence or dwell time in the transport line adsorber 102 to permit the sorbent particles 110 to substantially remove substantially all, approximately 90%, nitrogen oxides and sulfur oxides from the pressurized flue gas while the flue gas is transporting the sorbent particles 110 upwardly through the transport line adsorber 102. It has been determined that for sorbent particles having a size of about 50 microns, the length of the transport line adsorber will be about 35 feet and, it has been determined, for sorbent particles having a size of about 150 microns, the length of the transport line 102 will be about 200–285 feet.

The diameter of the transport line adsorber 102 will be chosen to provide the pressurized flue gas 108 with a velocity through the transport line adsorber greater than the terminal velocity of the sorbent particles 110, to facilitate the sorbent particles remaining entrained in the flue gas while being transported upwardly through the transport line adsorber by the pressurized flue gas. In the event the pressure of the flue gas 108 is insufficient to transport the sorbent particles 110 upwardly through the transport line adsorber 102, and insufficient to provide the flue gas with a velocity through the transport line adsorber greater than the terminal velocity of the particles 110 for a given transport line adsorber diameter, a suitable booster fan may be interposed between the exit of the pressurized flue gas from the power plant (not shown) to boost or increase the pressure of the flue gas sufficiently to entrain the sorbent particles and transport the sorbent particles upwardly through the transport line adsorber and to provide the pressurized flue gas with a velocity through the transport line adsorber greater than the terminal velocity of the sorbent particles.

Upon the sorbent particles 110 adsorbing the nitrogen oxides and sulfur oxides from the pressurized flue gas 108 as described above, the sorbent particles 110 become substantially saturated sorbent particles.

A suitable gas-solid separator 112 is connected to the output 113 at the top portion 106 of the transport line adsorber 102 and is for receiving and separating the substantially saturated sorbent particles and the pressurized flue gas 108 and for producing a stream of flue gas indicated by arrow 114 with the nitrogen oxides and sulfur oxides substantially removed therefrom. The gas-solid separator 112 may be a suitable cyclone of the type known to the art and generally referred to as a conical classifier utilizing rotating air for separating finely divided particles from a fluid stream in which the particles are entrained. Accordingly, it will be understood that the cyclone 112 is generally conical in configuration and imparts rotation to the pressurized flue gas 108 and substantially saturated sorbent particles 110 to separate the saturated sorbent particles and pressurized flue gas to produce a nitrogen oxide and sulfur oxide free stream of flue gas indicated by arrow 114 and a stream of sorbent particles having the nitrogen oxides and sulfur oxides adsorbed thereto indicated by the solid arrow A1. Alternatively, instead of the gas-solid separator 112, a suitable bag house may be connected to the top portion 106 of the transport line adsorber 102 for receiving and separating the saturated sorbent particles and the pressurized gas 108 and for producing the oxide free stream of flue gas indicated by arrow 114.

A first plurality of interconnected cyclones is provided and indicated by general numerical designation 120. Plurality of cyclones 120 includes a top cyclone 122, a middle cyclone 124 and a bottom cyclone 126. Such cyclones may each be of the same type as cyclone 112. It will be noted from FIG. 3 that the plurality of cyclones 120 is disposed in a staggered vertically downward sequence with the middle cyclone 124 being displaced downwardly and laterally rightwardly with respect to top cyclone 122 and that bottom cyclone 126 is displaced downwardly and laterally leftwardly with respect to the middle cyclone 124. A suitable air heater 130 is provided for heating air to approximately 650° C. and for providing heated air to the plurality of cyclones 120, the specific temperature of the heated air will depend upon the specific regenerant gas used. The interconnections between the plurality of cyclones 120 and the interconnection between the air heater 130 and the plurality of cyclones 120 are indicated by the solid arrows 131–136. More particularly, it will be noted that the connection of the output of the air heater 130 to the bottom portion of the middle cyclone 124 is indicated by arrow 131, that the connection between the bottom portion of the middle cyclone 124 and the top portion of the bottom cyclone 126 is indicated by arrow 132, that the interconnection between the top portion of the bottom cyclone 126 and the bottom portion of the top cyclone 122 and the top portion of the middle cyclone 124 is indicated by arrows 133 and 134, and that the connection between the top portion of the middle cyclone 124 to the top portion of the top cyclone 122 is indicated by arrows 135 and 136; it will be further noted that the interconnection between the bottom portion or outlet of the gas-solid separator 112 and the inlet of the plurality of cyclones 120 or the top of the middle cyclone 124 and the top of the top cyclone 122 is indicated by line 137. It will be also understood that the directions of the solid arrows 131–136 also indicate the direction of the flow of the heated air from the air heater 130 through the plurality of cyclones 120.

The outlined arrows shown at the top portion of FIG. 3 indicate the flow of the saturated sorbent particles from the bottom portion or outlet of the gas-solid separator 112 and through the plurality of cyclones 120 and to a suitable regenerator 140. It will be understood that the sorbent particles are passed or circulated through the plurality of interconnected cyclones 120 by a combination of flow of the heated air through the cyclones 120 and gravity. Generally, as the sorbent particles and heated air enter each cyclone of the plurality 120, rotary motion is imparted to the sorbent particles and heated air to contact the sorbent particles with the heated air to heat the sorbent particles sufficiently to desorb or remove the nitrogen oxides therefrom and to separate the removed nitrogen oxides and the sorbent particles; ultimately, an off gas stream of heated air indicated by arrow 142 at the top portion of the top cyclone 122 carries away the nitrogen oxides removed from the sorbent particles. Heated gas stream 142 and the removed nitrogen oxides carried thereby may be introduced into the combustion gas stream of the power plant (not shown) producing the pressurized flue gas 108. More particularly, it will be understood that the sorbent particles from the bottom of the gas solid separator 112 are transported by the heated air indicated by arrow 136 to the top portion of the top cyclone 122 where rotary motion is imparted to the sorbent particles and heated air to contact the sorbent particles with the heated air to heat the sorbent particles and remove the nitrogen oxides from the sorbent particles and at least partially separate the sorbent particles from the heated air, thereafter the sorbent particles separated by the top cyclone 122 is transported from the bottom portion of the top cyclone 122 to the top portion of the middle cyclone 124 by a combination of gravity and the flow of heated air indicated by the arrow 134 whereupon rotary motion is imparted to the sorbent particles and heated gas by the middle cyclone 124 to further contact the sorbent particles with heated air to heat the sorbent particles sufficiently to remove nitrogen oxides therefrom and to at least further partially separate the heated air and sorbent particles, thereafter the sorbent particles separated by the middle cyclone 124 from the heated gas are transported from the bottom portion of the middle cyclone 124 to the top portion of the bottom cyclone 126 by a combination of gravity and the flow of the heated air indicated by the arrow 132 whereupon rotary motion is imparted to the sorbent particles and heated gas by the bottom cyclone 126 to further contact the sorbent particles with the heated air to heat the sorbent particles sufficiently to further remove nitrogen oxide from the sorbent particles and separate the sorbent particles from the removed nitrogen oxides and heated gas. It will be understood that although three cyclones have been indicated as comprising the plurality of cyclones 120 that such plurality of three cyclones is merely illustrative of the present invention and that the plurality of interconnected cyclones 120 will comprise a sufficient number of interconnected cyclones to assure that substantially all of the nitrogen oxides are removed from the sorbent particles upon the sorbent particles being transported or passed through the plurality of cyclones and contacted with the heated air, and the sorbent particles heated to the sulfur regenerative temperature.

Referring again to the plurality of cyclones 120, it will be noted that the plurality of cyclones 120 are interconnected in such a manner to cause the flow of sorbent particles therethrough indicated by the outline arrows to be generally or substantially counter to the flow of the heated air therethrough indicated by the solid arrows 132–136. Such counter flow enhances the contacting of the heated air with the sorbent particles to facilitate removal of substantially all of the nitrogen oxides from the sorbent particles.

Figure 1:
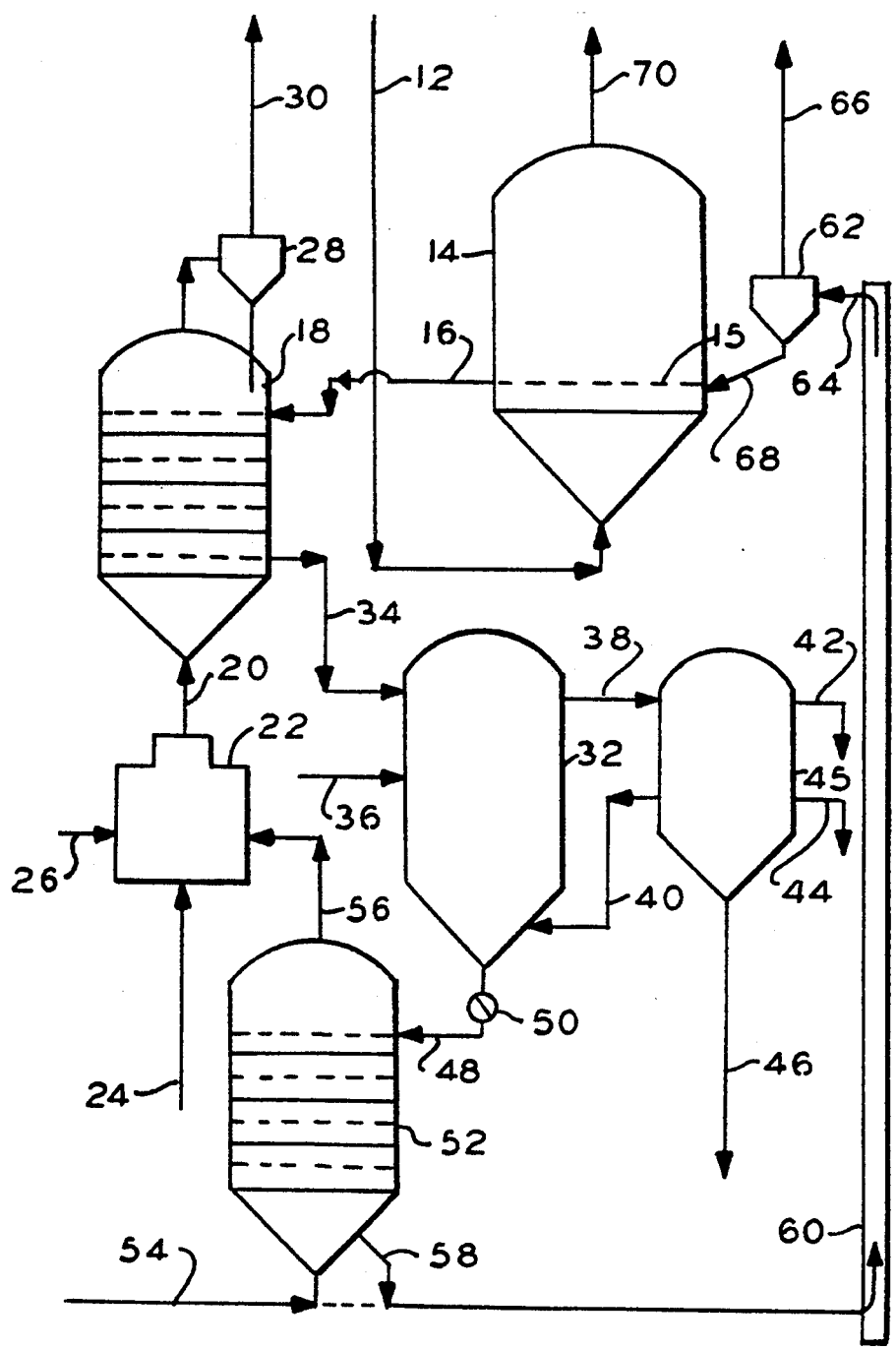
FIG. 1 is a diagrammatical illustration of the NOXSO Process.
Figure 2:
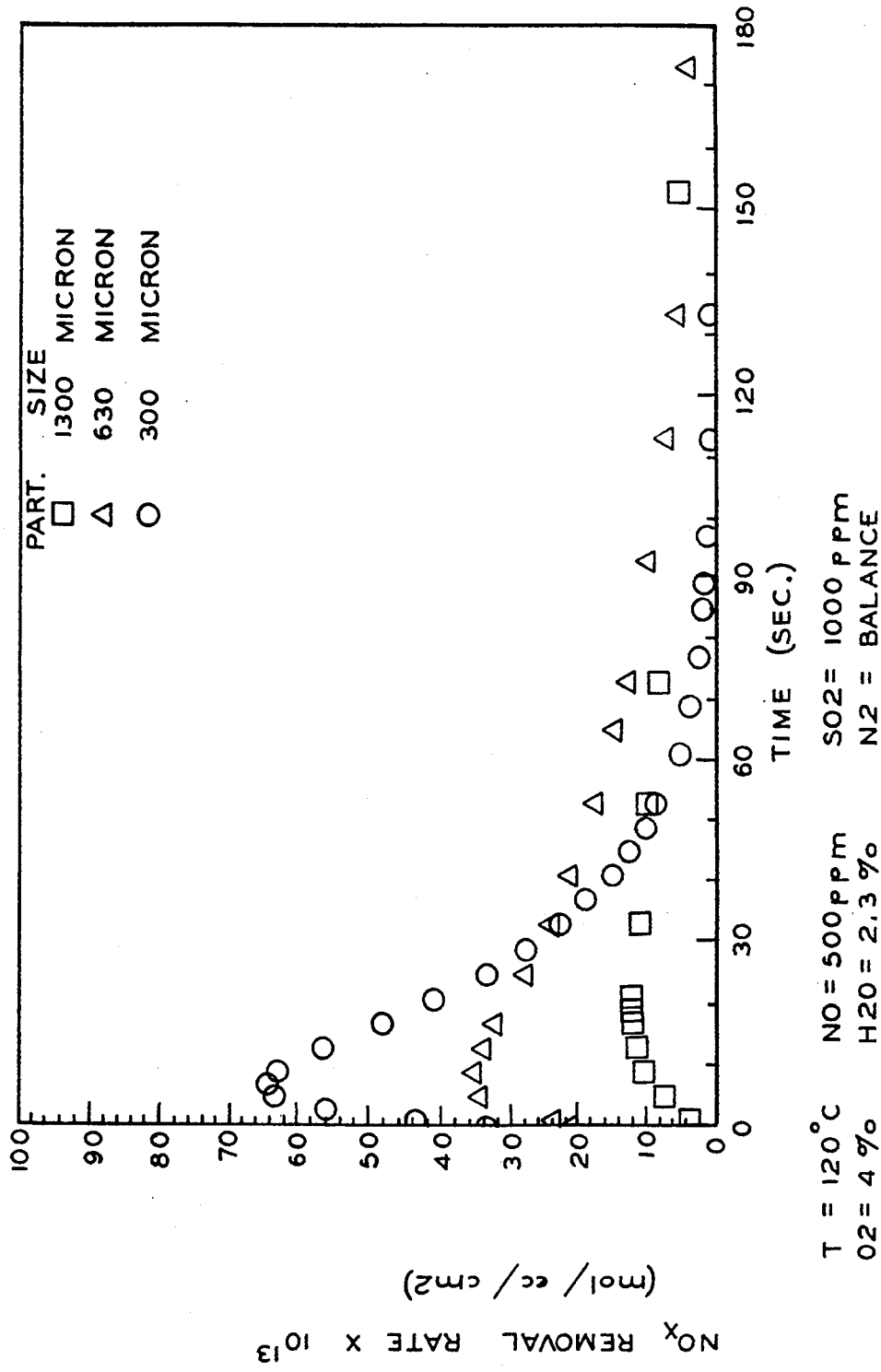
FIG. 2 is a graph showing $NO_x$ removal rate versus sorbent particle size or diameter.

Heated sorbent particles with the nitrogen oxides removed therefrom, but still having the sulfur oxides adsorbed thereto, are transported over the line 146, such as by gravity flow, to the regenerator 140 which may be, for example, the moving bed regenerator 32 shown in FIG. 1 of the patents identified above and incorporated herein by reference. Such sorbent particles will be contacted in the regenerator 140 by a suitable regenerant gas of the type disclosed in the above-identified patents incorporated herein by reference. As taught in the incorporated patents, the regenerant gas upon contacting the heated sorbent particles having the sulfur oxides adsorbed thereto will remove the sulfur oxides and produce heated sorbent particles having the sulfur oxides removed therefrom and an of gas stream of regenerant gas carrying the removed sulfur oxides away, for example to a suitable Claus plant of the type known to the art. The regenerant gas is indicated by arrow 147 in FIG. 3 and the off gas stream of regenerant gas carrying the sulfur oxides away is indicated by the arrow 148.

A second plurality of interconnected cyclones is provided and indicated by general numerical designation 150. Plurality of cyclones 150 includes a top cyclone 152, a middle cyclone 154 and a bottom cyclone 156. Such cyclones may be of the same type as the cyclone comprising the gas-solid separator 112 as described above. It will be noted from FIG. 3 that the plurality of cyclones 150 is disposed in a staggered vertically downward sequence with the middle cyclone 154 being displaced downwardly and laterally leftwardly with respect to the top cyclone 152 and that the bottom cyclone 156 is displaced downwardly and laterally rightwardly with respect to the middle cyclone 154. A suitable fan 160 is provided for providing cooling air to the plurality of cyclones 150; for example the input to the fan 160 may be ambient air indicated by arrow 162. The interconnections between the fan 160 and the plurality of cyclones 150 are indicated by the solid arrows 161–166. More particularly, it will be noted that the connection of the output of the fan 160 to the bottom portion of the middle cyclone 154 is indicated by arrow 161, that the connection between the bottom portion of the middle cyclone 154 and the top portion of the bottom cyclone 156 is indicated by arrow 162, that the interconnection between the top portion of the bottom cyclone 156 and the bottom portion of the top cyclone 152 and the top portion of middle cyclone 154 is indicated by arrows 163 and 164, and that the connection between the top portion of the middle cyclone 154 to the top portion of the top cyclone 152 is indicated by arrows 165 and 166; it will be further noted that the interconnection between the top portion of the top cyclone 152 and the air heater 130 is indicated by arrow 167. It will be also understood that the directions of the solid arrows 161–167 also indicate the direction of the flow of the cooling air from the fan 160 through the plurality of cyclones 150 and to the air heater 130.

The outline arrows shown at the bottom portion of FIG. 3 indicate the flow of the heated regenerated sorbent particles from the bottom of the regenerator 140 and through the plurality of cyclones 150 to the bottom portion 104 of the transport line adsorber 102. It will be understood that the heated regenerated sorbent particles from the regenerator 140 are passed or circulated through the plurality of interconnected cyclones 150 by a combination of flow of the cooling air indicated by the solid arrows 161–166 through the cyclones 150 and gravity. Generally, as the heated regenerated sorbent particles from the regenerator 140 and the cooling air enter each cyclone of the plurality 150, rotary motion is imparted to the heated regenerated sorbent particles and cooling air to contact the heated regenerated sorbent particles with the cooling air to cool the sorbent particles sufficiently to place them in a suitable condition for readmittance or reentry into the bottom portion 104 of the transport line adsorber 102 and to separate the heated regenerated sorbent particles and the cooling air from the fan 160; ultimately, an off gas stream of cooling air indicated by arrow 167 at the top portion of the top cyclone 152 enters the air heater 130 for heating to supply the heated air provided by the air heater 130. More particularly, it will be understood that the heated regenerated particles from the bottom of the regenerator 140 are transported by gravity to the interconnections between the top portion of the middle cyclone 154 and the top portion of the top cyclone 152 indicated by the arrows 165 and 166 and that such heated regenerated sorbent particles are transported from the bottom of the regenerator 140 to the top portion of the top cyclone 152 by the combination of gravity and the flow of cooling air indicated by the arrow 166. Upon entering the top cyclone 152, rotary motion is imparted to the heated regenerated sorbent particles and the cooling air to contact the heated regenerated sorbent particles with the cooling air to at least partially cool the heated regenerated sorbent particles and to separate such particles from the cooling air; thereafter, the partially cooled regenerated sorbent particles separated by the top cyclone 152 are transported from the bottom portion of the top cyclone 152 to the top portion of the middle cyclone 154 by a combination of gravity and the flow of cooling air indicated by the arrow 164 whereupon rotary motion is imparted to the sorbent and cooling air to further at least partially cool the heated regenerated sorbent particles and to further separate the cooling air and the regenerated sorbent particles, thereafter, the regenerated sorbent particles separated by the middle cyclone 154 is transported from the bottom portion of the middle cyclone 154 to the top portion of the bottom cyclone 156 by a combination of gravity and the flow of cooling air indicated by the arrow 162 whereupon rotary motion is imparted to the cooling air and partially cooled regenerated sorbent particles to further at least partially cool the regenerated sorbent particles and further separate such particles from the cooling air; the now cooled regenerated sorbent particles separated by the bottom cyclone 156 are then transported by gravity to the bottom portion 104 of the transport line adsorber 102 as noted above for recycling. It will be understood that although three cyclones have been indicated as comprising the plurality of cyclones 150 that such plurality of three cyclones is merely illustrative of the present invention and that the plurality of interconnected cyclones 150 will comprise a sufficient number of interconnected cyclones to assure that the heated regenerated sorbent from the regenerator 140 is cooled sufficiently to place the regenerated sorbent in a thermal condition suitable for readmittance or reentry into the bottom portion 104 of the transport line adsorber 102 for recycling and readsorption of the nitrogen oxides and sulfur oxides 108. The plurality of cyclones 150 will also be of sufficient number to assure substantially total separation of the regenerated sorbent particles and cooling air from the fan 160.

Referring again to the plurality of cyclones 150, it will be noted that the plurality of cyclones 150 are interconnected in such a manner to cause the flow of heated regenerated sorbent particles from the regenerator 140 through the cyclones indicated by the outline arrows to be generally or substantially counter to the flow of the cooling air through the plurality of cyclones 150 indicated by the solid arrows 162–166. Such counter flow enhances the contacting of the cooling air with the heated regenerated sorbent particles to facilitate substantial cooling of the regenerated sorbent particles and substantial separation of the cooled regenerated sorbent particles from the cooling air from the fan 160.

Referring again to the plurality of cyclones 120, it will be understood that a cone of sorbent will be present at the bottom portion of the cyclones 122, 124 and 126 and that such cone of sorbent particles prevents the entry of the heated air from the air heater 130 into the bottom portions of the middle cyclone 124 and the top cyclone 122. Similarly, it will be understood, that a cone of heated regenerated sorbent particles will be present at the bottom portions of the top cyclone 152 and the middle cyclone 154 of the plurality of cyclones 150 and that such cone of heated regenerated sorbent particles prevents the entry of the cooling air into the bottom portions of the middle cyclone 154 and the top cyclone 152.

It will be understood that the apparatus and process of the present invention described above and illustrated diagrammatically in FIG. 3, due to the comparative or relatively small size of the sorbent particles 110 (about 30 microns to about 500 microns as noted above) is particularly useful in adsorbing or removing nitrogen oxides and sulfur oxides from flue gas that is relatively free from fly ash. However, in the event that the flue gas, such as flue gas 108, has a relatively high content of fly ash, the apparatus and process of the present invention using such relatively small sized sorbent particles can still be utilized but such may require the interposition of a bag house or fly ash control apparatus between the source of the flue gas 108 and the lower portion 104 of the transport line adsorber 102.

Figure 5:
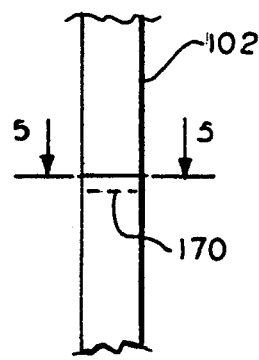
FIG. 5 is a partial elevational view of an alternate embodiment of the transport lane adsorber shown in FIGS. 3 and 4.
Figure 5A:
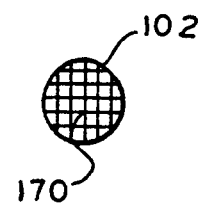
FIG. 5A is a horizontal cross-sectional view taken generally along the line 5—5 in FIG. 5 in the direction of the arrows.
Figure 8:
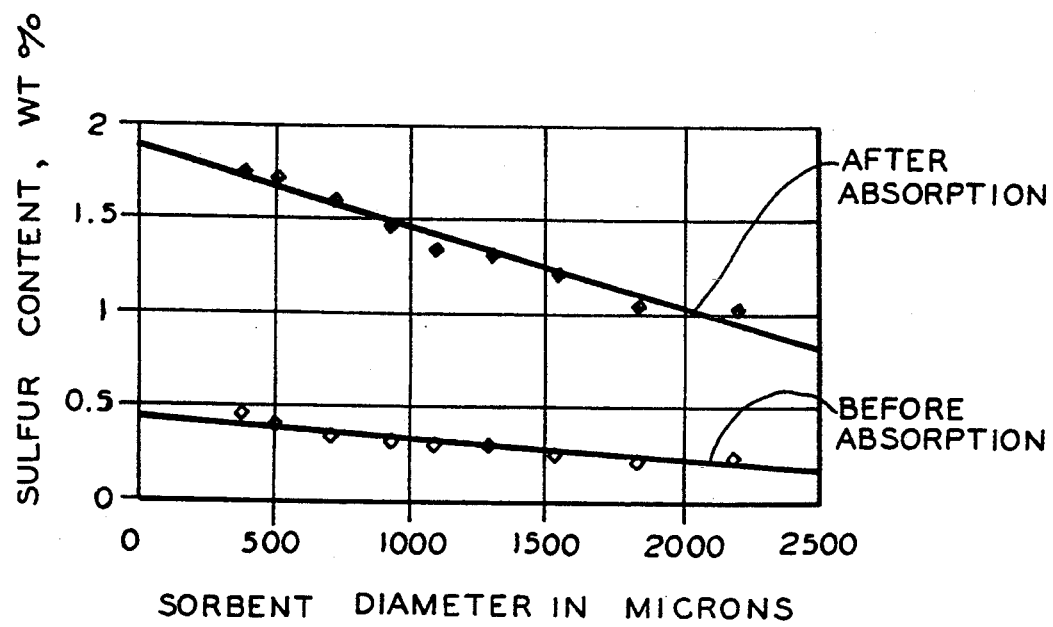
FIG. 8 is a graph showing sulfur content by percent weight versus sorbent particle size or diameter.

In an alternate embodiment, the transport line adsorber 102 may be provided with one or more screens suitably mounted transversely and internally thereof as illustrated diagrammatically by the representative screen 170 in FIGS. 5 and 5A. Such screen or screens preferentially or selectively slow the flow of the sorbent particles through the transport line adsorber without substantially slowing the flow of the pressurized gas therethrough; such screen or screens preferably will have a mesh number less than 100. By slowing the flow of the sorbent particles through the transport line adsorber relative to the flow of the pressurized gas therethrough, the sorbent particles are exposed to different portions of the pressurized gas and the adsorption of the nitrogen oxides and sulfur oxides by the sorbent particles is enhanced and the oxide removal efficiency increased.

Referring now to FIG. 4, a further alternate embodiment of the present invention is shown which is the same as the embodiment shown in FIG. 3 and described above, except that the embodiment shown in FIG. 4 includes a sorbent particle stream splitter 174 mounted intermediate the output of the gas-solid separator 112 and an input to the plurality of cyclones 120; the sorbent particle splitter may be any one of several known to the art for splitting or dividing a string of particles into at least two streams of particles. The sorbent particle stream splitter 174 has an input 176 connected to the output of the gas-solid separator 112 and a first output 178 connected to the input of the plurality of cyclones 120 and a second output 179 connected to a suitable line 180 connecting the second output 179 of the sorbent particle stream splitter 174 to the bottom portion 104 of the transport line adsorber 102 to return a portion of the sorbent particles having the nitrogen oxides and sulfur oxides adsorbed thereto to the bottom input portion of the transport line adsorber 102 for retransportation upwardly through the transport line adsorber by the pressurized flue gas as described above. This return or recycling of a portion of the sorbent particles increases the nitrogen oxides and sulfur oxides adsorbed by the returned or recycled sorbent particles and enhances the efficiency of the oxide removal apparatus and process. In the preferred embodiment, about 30% of the sorbent particles from the gas-solid separator 112 is diverted to the plurality of cyclones by the sorbent particle stream splitter for regeneration and about 70% is returned to the transport line adsorber 102 for recycling.

Figure 4:
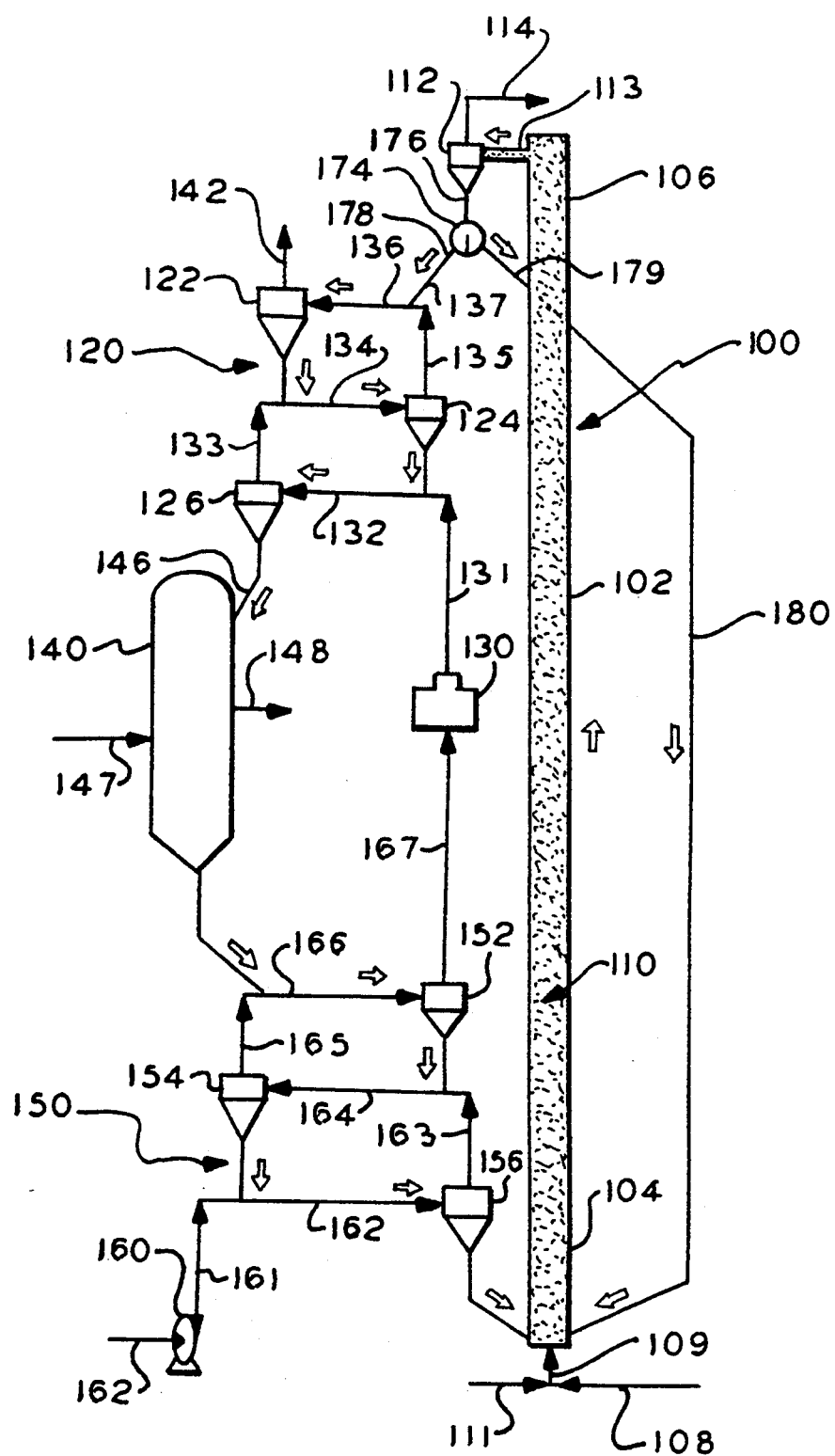
FIG. 4 is a diagrammatical illustration of an alternate embodiment of the apparatus illustrated in FIG. 3.
Figure 6:
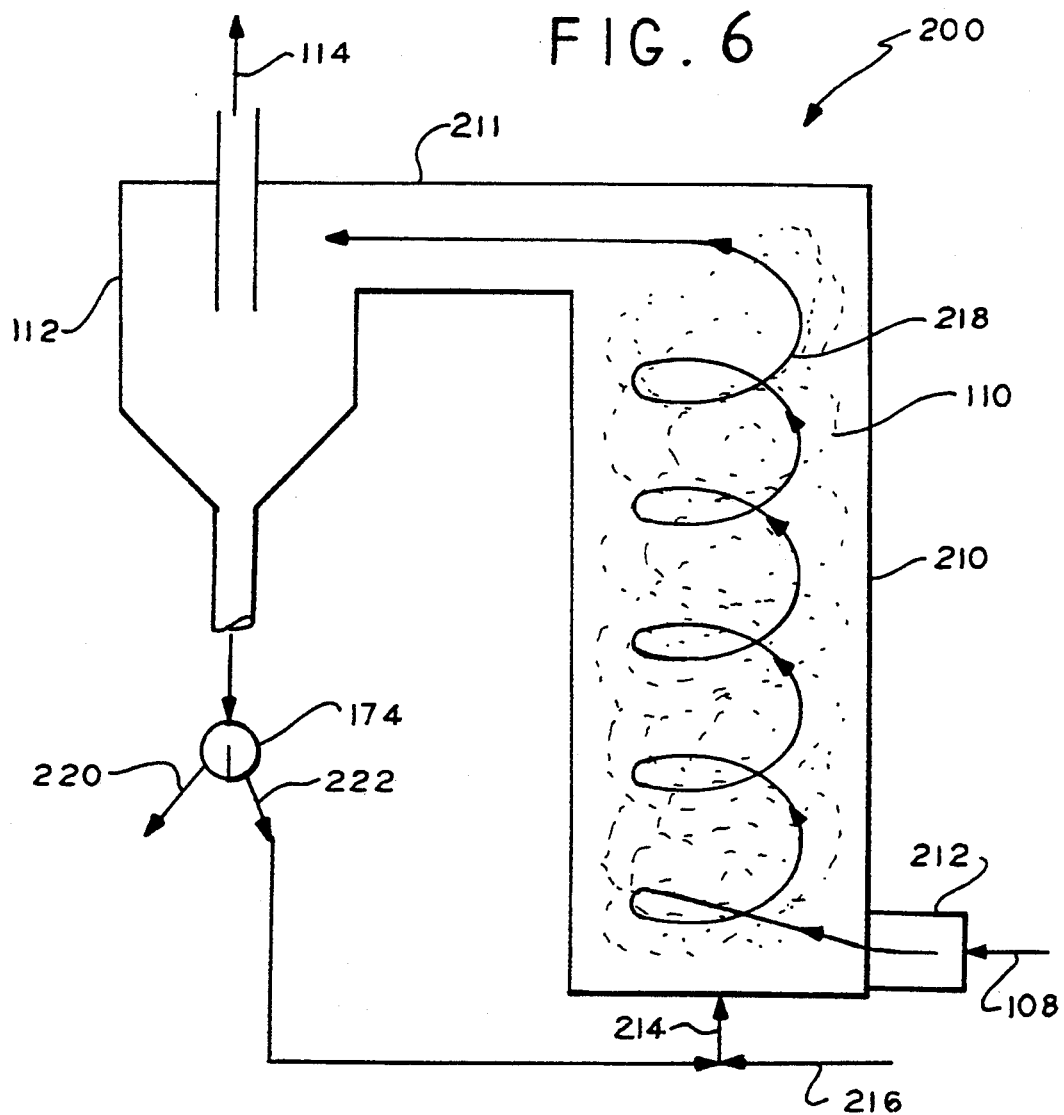
FIG. 6 is a diagrammatical illustration of a cyclone reactor which is an entrained flow adsorber which may be used as an alternative in the present invention to the transport line adsorber shown in FIGS. 3 and 4.
Figure 6A:
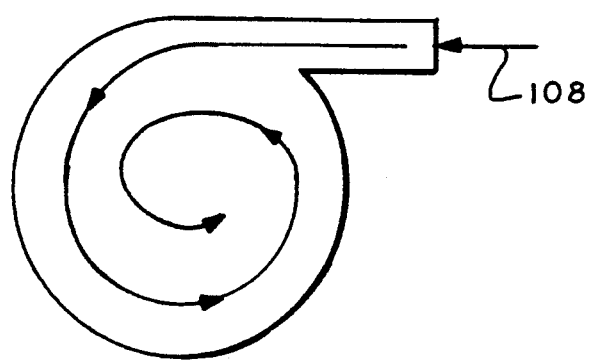
FIG. 6A is a diagrammatical illustration of the bottom view of the cyclone reactor shown in FIG. 6.
Figure 7:
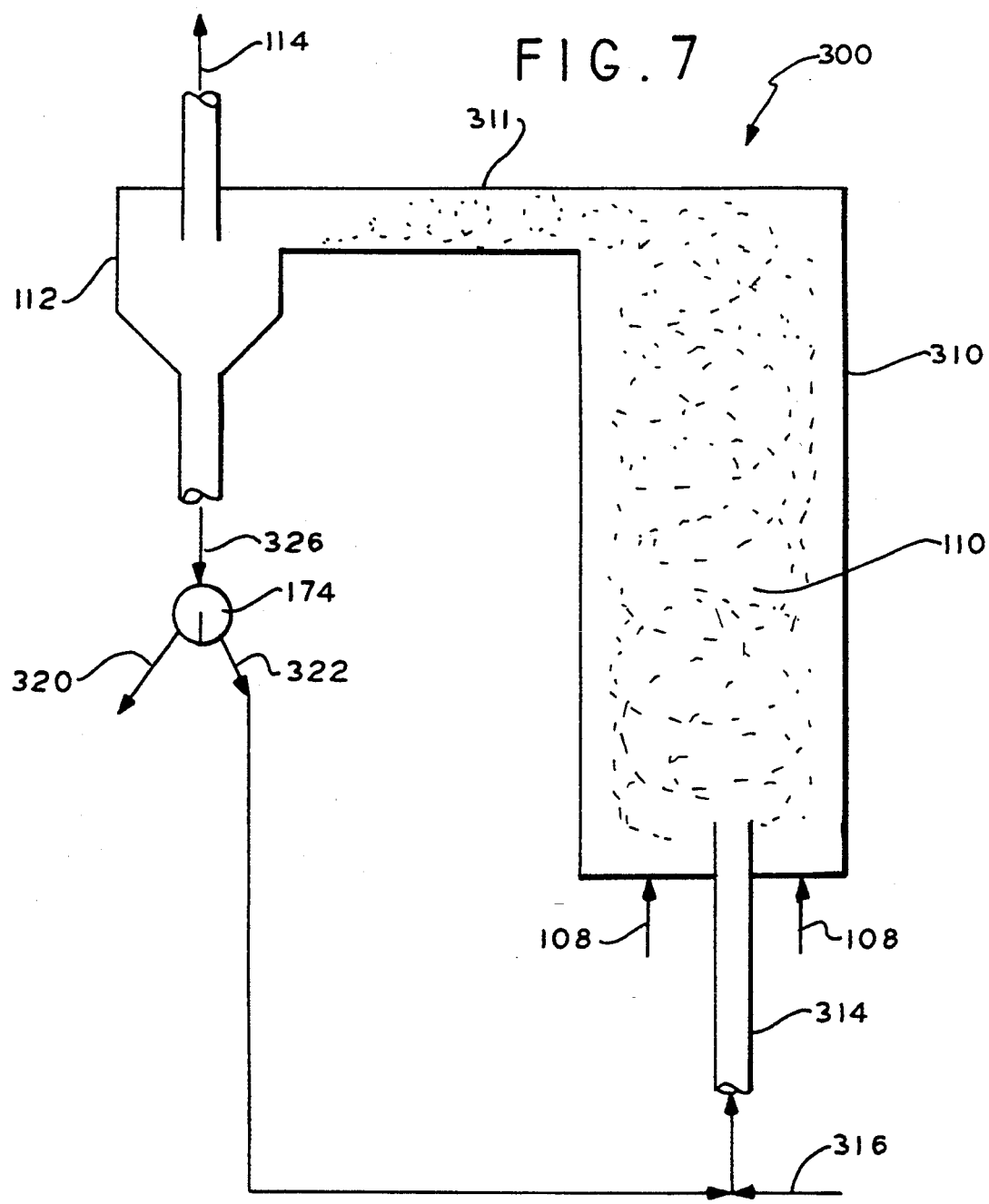
FIG. 7 is a diagrammatical illustration of a gas suspension adsorber which is an entrained flow adsorber which in accordance with the present invention may be used as an alternative to the transport line adsorber shown in FIGS. 3 and 4.

As alternatives to the transport line adsorber 102, FIGS. 3 and 4, other entrained flow adsorbers may be used in accordance with the present invention, such as for example, the cyclone reactor shown in FIG. 6 and indicated by general numerical designation 200 and the gas suspension adsorber shown in FIG. 7 and indicated by general numerical designation 300. Referring to FIG. 6, the cyclone reactor 200 includes a hollow generally vertically oriented vessel 210 having an output 211 connected to a gas-solid separator 112, such as the gas-solid separator 112 shown in FIGS. 3 and 4 and described above, and the output of which gas-solid separator is connected to the input of a sorbent particle stream splitter 174 which may be the sorbent particle stream splitter 174 shown in FIG. 4 and described above; one stream from one output of the sorbent particle stream splitter flows to the plurality of interconnected cyclones 120 shown in FIGS. 3 and 4, as indicated by arrow 220, and the other stream from the other output of the sorbent particle stream splitter 174 is returned to the input of the cyclone reactor 200 as indicated by the arrow 222 for recycling and enhanced oxide removal as described above. The vessel 210 of the cyclone reactor 200 is provided at its bottom portion with a tangentially oriented input 212 through which the pressurized flue gas 108 enters and which gas imparts a generally spiral upward flow to the pressurized flue gas as indicated by the spiral arrow 218. Fresh sorbent is introduced into an input port 214 located at the bottom of the vessel 210 and which fresh sorbent particles are indicated by the arrow 216. The sorbent particles introduced at the input port 214 are transported upwardly and provided with the spiral flow as indicated by the arrow 218 to transport the sorbent particles upwardly and to expose the sorbent particles to the flue gas and to cause the sorbent particles to adsorb the nitrogen oxides and sulfur oxides from the flue gas. The flue gas carrying the sorbent particles having the oxides adsorbed thereto flow to the gas-solid separator 112 out of the cyclone reactor output 211 where they are separated as described above in connection with the operation of the gas-solid separator 112.

The cyclone reactor with internal separation and axial recirculation disclosed in U.S. Pat. No. 4,881,476, patented Nov. 21, 1989, Frederick E. Becker, inventor, also may be used as an alternative to the transport line adsorber 102 shown in FIGS. 3 and 4 and described above.

Referring now to FIG. 7, the gas suspension adsorber 300 shown in FIG. 7 is a diagrammatical illustration of the gas suspension adsorber shown and described in Clean Coal Technology Demonstration Program, Program Update 1991, published February, 1992 by the U.S. Department of Energy. The gas suspension adsorber 300 includes a generally hollow vertical reactor vessel 310 in which the sorbent particles 110 come in contract with or are exposed to the pressurized flue gas entering the bottom portion of the vessel 310, as indicated by arrows 108, and the sorbent particles 110 are transported upwardly by the pressurized flue gas during which time the sorbent particles 110 adsorb the nitrogen oxides and sulfur oxides contained in the flue gas 108. The sorbent particles having such oxides adsorbed thereto and the pressurized flue gas exit the vessel 110 through the upper output 311 and enter the gas-solid separator 112 which separates the flue gas and the sorbent particles having the oxides adsorbed thereto to provide an offstream 114 free of such oxides and a stream of sorbent particles having the oxides adsorbed thereto which exit the gas-solid separator 112 and enter the sorbent particle splitter 174 as illustrated in FIG. 7 by the arrow 326. The sorbent particle splitter 174 functions in the same manner as the sorbent particle splitter 174 shown in FIG. 4 and described above to provide two streams of sorbent particles having the oxides adsorbed thereto one of which streams, indicated by arrow 320, goes to the plurality of cyclones 120 shown in FIGS. 3 and 4 and the other stream, as indicated by the arrow 322, is returned to the input 314 provided at the bottom portion of the vessel 310 for recycling and increased oxide removal efficiency as described above. Fresh sorbent particles are also introduced into the input 314 as indicated by the arrow 316.

The above-noted sorbent may be composed of γ-alumina substrate on which sodium is deposited. The particles or beads may be made using one of several processes depending upon the bead size and other factors. The process may begin with the formation of a paste or water and the very small particles of alumina (about 10μ in diameter). In the process to make beads in the 50 to 150 micron range, the paste is sprayed through a nozzle into a spray dryer. The small beads produced by the nozzle are dried as they fall through air to the bottom of a spray chamber where they are collected and removed.

It will be understood by those skilled in the art that many variations and modifications may be made in the present invention without departing from the spirit and the scope thereof.

What is claimed is:

1. Process for utilizing cooled regenerated sorbent particles to substantially remove nitrogen oxides and sulfur oxides from pressurized flue gas, comprising the steps of:
   providing sorbent particles suitable for adsorbing nitrogen oxides and sulfur oxides from said flue gas and providing said sorbent particles of an average size in the range of about 30 to about 500 microns;
   transporting said sorbent particles through entrained flow adsorber means utilizing said pressurized flue gas to cause said sorbent particles to substantially adsorb said nitrogen oxides and said sulfur oxides from said flue gas while said sorbent particles are being transported through said entrained flow adsorber means by said pressurized flue gas;
   separating said sorbent particles having said oxides adsorbed thereto from said flue gas to provide a stream of substantially nitrogen oxide and sulfur oxide free flue gas and to provide sorbent particles having said oxides adsorbed thereto;
   providing a source of heated gas;
   passing at least some said sorbent particles having said oxides adsorbed thereto through a plurality of interconnected cyclones utilizing said heated gas and gravity to heat said sorbent particles to remove said nitrogen oxides therefrom and to separate said sorbent particles and remove nitrogen oxides and to produce an off gas stream of heated gas carrying away said nitrogen oxides and to provide heated sorbent particles having said sulfur oxides adsorbed thereto;
   contacting said heated sorbent particles having said sulfur oxides adsorbed thereto with a regenerant gas to substantially remove said sulfur oxides therefrom and to produce heated regenerated sorbent particles and an off gas stream of regenerant gas carrying away said sulfur oxides removed from said heated regenerated sorbent particles;
   providing a cooling gas;
   passing said heated regenerated sorbent particles through a second plurality of interconnected cyclones utilizing said cooling gas and gravity to cool said sorbent particles and to separate said sorbent particles from said cooling gas to produce cooled regenerated sorbent particles; and
   returning said cooled regenerated sorbent particles to said entrained flow adsorber means and repeating said steps for removing said nitrogen oxides and said sulfur oxides from said pressurized flue gas.

2. The process according to claim 1 wherein said process includes the further step, intermediate said step of separating said sorbent particles having said oxides adsorbed thereto from said flue gas and said step of providing a source of heated gas, of returning a portion of said sorbent particles having said oxides adsorbed thereto to said entrained flow adsorber means to enhance the adsorption of said oxides by said portion of returned sorbent particles.

3. The process according to claim 1 wherein said step of transporting said sorbent particles through said entrained flow adsorber means is the step of transporting said sorbent particles through a transport line adsorber.

4. The process according to claim 1 wherein said step of transporting said sorbent particles through entrained flow adsorber means is the step of transporting said sorbent particles through a cyclone reactor.

5. The process according to claim 1 wherein said step of transporting said sorbent particles in a fluidized state through entrained flow adsorber means is the step of transporting said sorbent particles in a fluidized state through a gas suspension adsorber.

6. Process for utilizing cooled regenerated sorbent particles to substantially remove nitrogen oxides and sulfur oxides from pressurized flue gas, comprising the steps of:
   providing sorbent particles suitable for adsorbing nitrogen oxides and sulfur oxides from said flue gas and providing said sorbent particles of an average size in the range of about 30 to about 500 microns;
   transporting said sorbent particles in a fluidized state through a transport line adsorber utilizing said pressurized flue gas to cause said sorbent particles to substantially adsorb said nitrogen oxides and said sulfur oxides from said flue gas while said sorbent particles are being transported through said transport line adsorber by said pressurized flue gas, upon said sorbent particles adsorbing said nitrogen oxides and said sulfur oxides;
   separating the adsorbed oxide containing sorbent particles which have adsorbed said nitrogen oxides and said sulfur oxides from said flue gas to provide a stream of substantially nitrogen oxide and sulfur oxide free flue gas;
   providing a source of heated gas; passing at least some of said adsorbed oxide containing sorbent particles and said heated gas through a means for recovering nitrogen oxides whereby said adsorbed oxide containing sorbent particles are heated to remove therefrom said nitrogen oxides and through a means for separating said sorbent and said removed nitrogen oxides so as to produce an off gas stream of heated gas carrying away said nitrogen oxides;
   contacting said heated sorbent with a regenerant gas to substantially remove said sulfur oxides from said sorbent particles and to produce heated regenerated sorbent and an off gas stream of regenerant gas carrying away said sulfur oxides removed from said heated regenerated sorbent;
   providing a cooling gas;
   cooling said heated regenerated sorbent with said cooling gas to cool said sorbent particles and separating said sorbent particles from said cooling gas to produce cooled regenerated sorbent; and returning said cooled regenerated sorbent to said transport line adsorber to repeat said steps for removing said nitrogen oxides and said sulfur oxides from said pressurized flue gas.

7. Apparatus for utilizing cooled regenerated sorbent particles to substantially remove nitrogen oxides and sulfur oxides from pressurized flue gas, said sorbent particles suitable for adsorbing nitrogen oxides and sulfur oxides and having a size in the range of about 30 to about 500 microns, comprising:

a hollow generally cylindrical and generally vertically oriented transport line adsorber having bottom inlet and top outlet portions, said bottom inlet portion for admitting said sorbent particles and said pressurized flue gas into said transport line adsorber, upon being admitted into said transport line adsorber said pressurized flue gas transporting said sorbent particles upwardly through said transport line adsorber to said top outlet portion thereof and said sorbent particles substantially adsorbing said nitrogen oxides and said sulfur oxides from said flue gas while being transported upwardly through said transport line adsorber whereupon said sorbent particles become sorbent particles substantially saturated with said nitrogen oxides and said sulfur oxides;

a gas-solid separator having an inlet connected to said top outlet portion of said transport line adsorber for receiving and separating said pressurized flue gas and said sorbent particles and for producing a stream of flue gas with said nitrogen oxides and said sulfur oxides substantially removed therefrom and for producing a stream of sorbent particles, said separator having a first outlet through which said flue gas exits and a second outlet through which said stream of sorbent particles exit;

a first plurality of interconnected cyclones having first and second inlets, said first inlet connected to said second outlet of said gas-solid separator, said gas-solid separator for receiving said stream of sorbent particles and a heated gas, for contacting said sorbent particles with said heated gas to produce a stream of heated sorbent particles having said nitrogen oxides substantially removed therefrom, and for substantially separating said heated sorbent particles and said heated gas to produce an off gas stream of heated gas carrying said nitrogen oxides removed from said sorbent particles, said first plurality of interconnected cyclones having an outlet;

a regenerator having an inlet connected to said outlet of said first plurality of interconnected cyclones and for receiving said stream of heated sorbent particles having said nitrogen oxides removed therefrom and a regenerant gas, said regenerator for contacting said heated sorbent particles with said regenerant gas to substantially remove said sulfur oxides from said heated sorbent particles and produce a stream of regenerated heated sorbent particles having said oxides removed therefrom and an off gas stream of regenerant gas carrying said sulfur oxides removed from said heated regenerated sorbent particles, said regenerator having an outlet;

a second plurality of interconnected cyclones having an inlet connected to said outlet of said regenerator and for receiving said stream of heated regenerated sorbent particles and a cooling gas, said second plurality of interconnected cyclones for contacting said heated regenerated sorbent particles with said cooling gas to cool said heated regenerated sorbent particles and produce said cooled regenerated sorbent particles and for separating said cooled regenerated sorbent particles and said cooling gas to produce an off gas stream of said cooling gas, said second plurality of interconnected cyclones having first and second outlets, said first outlet connected to said bottom inlet portion of said transport line adsorber and said off gas stream of cooling gas exiting said second outlet;

a heater interconnected between said second outlet of said second plurality of interconnected cyclones and said second inlet of said first plurality of interconnected cyclones, said heater for receiving said off gas stream of cooling gas and for heating said cooling gas to produce said heated gas and for providing said heated gas to said first plurality of interconnected cyclones;

said regenerator positioned below said first plurality of interconnected cyclones and said second plurality of interconnected cyclones positioned below said regenerator and said sorbent particles flowing generally downward through said first plurality of cyclones, said regenerator and said second plurality of cyclones at least partially by gravity flow; and said bottom inlet portion of said transport line adsorber also for receiving said cooled regenerated sorbent particles and said pressurized flue gas to cause said pressurized flue gas to lift said cooled regenerated sorbent particles from said second plurality of interconnected cyclones up to said first plurality of interconnected cyclones to repeat said removal of said nitrogen oxides and said sulfur oxides from said flue gas.

8. The apparatus according to claim 7 wherein said first plurality of interconnected cyclones are interconnected in a manner to cause the flow of said sorbent particles therethrough to be substantially counter to the flow of said heating gas therethrough, and wherein said second plurality of interconnected cyclones are interconnected in a manner to cause the flow of said sorbent particles therethrough to be substantially counter to the flow of said cooling gas therethrough.

9. The apparatus according to claim 7 wherein said first plurality of interconnected cyclones comprise top, middle and bottom cyclones, each cyclone having a top and bottom portion, said bottom portion of said middle cyclone and said top portion of said bottom cyclone interconnected, said top portion of said bottom cyclone and said bottom portion of said top cyclone and said top portion of said middle cyclone interconnected, and said top portion of said middle cyclone and said top portion of said top cyclone interconnected, said heated gas being transported to said top portion of said bottom cyclone and from said top portion of said bottom cyclone to said top portion of said middle cyclone and from said top portion of said middle cyclone to said top portion of said top cyclone, and said sorbent particles being transported to said top portion of said top cyclone in which top cyclone said sorbent particles are contacted by said heated gas to at least partially remove said nitrogen oxides from said sorbent particles and to separate said heated gas and said sorbent particles, and said sorbent particles exiting said bottom portion of said top cyclone and being transported to said top portion of said middle cyclone by said heated gas and said sorbent particles being contacted in said middle cyclone by said heated gas to further at least partially remove said nitrogen oxides from said sorbent particles and to substantially separate said sorbent particles from said heated gas and said sorbent particles exiting said bottom portion of said middle cyclone and being transported to said top portion of said bottom cyclone by said heated gas and in which bottom cyclone said sorbent particles are further contacted by said heated gas to further substantially remove said nitrogen oxides from said sorbent particles and to substantially separate said sorbent particles from said heated gas.

10. The apparatus according to claim 7 wherein said second plurality of interconnected cyclones comprise top, middle and bottom cyclones, each cyclone having a top and bottom portion, said bottom portion of said middle cyclone and the top portion of said bottom cyclone interconnected, said top portion of said bottom cyclone and said bottom portion of said top cyclone and said top portion of said middle cyclone interconnected, said top portion of said middle cyclone and said top portion of said top cyclone interconnected, said cooling gas being transported to said top portion of said bottom cyclone and from said top portion of said bottom cyclone to said top portion of said middle cyclone and from said top portion of said middle cyclone to said top portion of said top cyclone, and said sorbent particles being transported to said top portion of said top cyclone in which top cyclone said sorbent particles are contacted by said cooling gas to at least partially cool said sorbent particles and to at least partially separate said cooling gas and said sorbent particles, and said sorbent particles exiting said bottom portion of said top cyclone and being transported to said top portion of said middle cyclone by said cooling gas and said sorbent particles being contacted in said middle cyclone by said cooling gas to further at least partially cool said sorbent particles and to at least further substantially separate said sorbent particles from said cooling gas and said sorbent particles exiting said bottom portion of said middle cyclone and being transported to said top portion of said bottom cyclone by said cooling gas and in which bottom cyclone said sorbent particles are further contacted by said cooling gas to further substantially cool said sorbent particles and to further substantially separate said sorbent particles from said cooling gas.

11. The apparatus according to claim 7 wherein said transport line adsorber has a length providing sufficient residence time of said sorbent particles therein for said sorbent particles to substantially adsorb said nitrogen oxides and said sulfur oxides from said flue gas during the time said sorbent particles are transported upwardly through said transport line adsorber by said-pressurized flue gas.

12. The apparatus according to claim 7 wherein said transport line adsorber has a diameter for providing said pressurized flue gas with a velocity through the transport line adsorber greater than the terminal velocity of said sorbent particles in said fluidized state to facilitate said sorbent particles remaining entrained in said pressurized flue gas while being transported upwardly through said transport line adsorber by said pressurized flue gas.

13. The apparatus according to claim 7 wherein said apparatus further comprises a particle stream splitter intermediate said outlet of said gas-solid separator and said first inlet of said first plurality of interconnected cyclones, said particle stream splitter having an inlet connected to said outlet of said gas-solid separator and having first and second outlets, said first outlet connected to said first inlet of said first plurality of interconnected cyclones, said particle stream splitter for receiving said stream of sorbent particles from said gas-solid separator and for producing first and second streams of said sorbent particles, said first stream of sorbent particles exiting said first outlet of said particle stream splitter and said second stream of sorbent particles exiting said second outlet of said particle stream splitter; and wherein said apparatus further comprises connecting means connected intermediate said second outlet of said particle stream splitter and said bottom inlet portion of said transport line adsorber to introduce said second stream of sorbent particles into said transport line adsorber.

14. The apparatus according to claim 7 wherein said transport line adsorber is provided with means mounted internally thereof for slowing the flow of said sorbent particles therethrough relative to the flow of said pressurized flue gas therethrough to enhance the adsorption of said oxides by said sorbent particles.

15. The apparatus according to claim 14 wherein said means mounted internally of said transport line adsorber comprise at least one screen mounted internally and transversely of said transport line adsorber.

16. Apparatus for using sorbent particles to adsorb nitrogen oxides and sulfur oxides from flue gas, said apparatus including an adsorber having an inlet and an outlet, said inlet for receiving said sorbent particles and said flue gas and for contacting said sorbent particles with said flue gas to cause said sorbent particles to adsorb said nitrogen oxides and said sulfur oxides from said flue gas, a first desorber having an inlet and an outlet, said inlet connected to said outlet of said adsorber and for receiving said sorbent particles with said nitrogen oxides and sulfur oxides adsorbed thereto and for heating said sorbent particles to desorb said nitrogen oxides therefrom to produce an off gas stream of nitrogen oxides, a second desorber having an inlet and an outlet, and said inlet connected to said outlet of said first desorber and for receiving said heated sorbent particles and for desorbing said sulfur oxides therefrom to produce an off gas stream of sulfur and to produce regenerated heated sorbent particles, and a cooler having an inlet and an outlet, said inlet connected to said outlet of said second desorber and for cooling said heated regenerated sorbent to produce cooled regenerated sorbent particles, and said second desorber positioned below said first desorber and said cooler positioned below said second desorber and said sorbent particles flowing downwardly through said first and second desorbers and said cooler at least partially by gravity flow, and wherein said apparatus includes a lift line having an inlet connected to said outlet of said cooler and an outlet connected to said inlet of said adsorber and for lifting said cooled regenerated sorbent particles from said cooler up to said adsorber and for repeating said removal of said nitrogen oxides and sulfur oxides from said flue gas, said flue gas being pressurized flue gas, WHEREIN THE IMPROVEMENT COMPRISES:

a transport line adsorber comprising said lift line and said adsorber, said transport line adsorber having an inlet connected to said outlet of said second desorber and an outlet connected to said inlet of said first desorber, said transport line adsorber for receiving said regenerated sorbent particles and said pressurized flue gas and through which transport line adsorber said regenerated sorbent particles are transported by said pressurized flue gas to cause said sorbent particles to adsorb said nitrogen oxides and said sulfur oxides from said flue gas, said pressurized flue gas also transporting said sorbent particles through said transfer line adsorber to lift said sorbent particles from said cooler up to said adsorber, said sorbent particles having a size in the range of about 30 to about 500 microns and said transport line adsorber thereby serving as a vehicle to perform both the functions of said lift line and said first adsorber;

said first desorber comprising a plurality of interconnected cyclones including top, middle and bottom cyclones, each cyclone having a top and bottom portion, said bottom portion of said middle cyclone and said top portion of said bottom cyclone interconnected, said top portion of said bottom cyclone and said bottom portion of said top cyclone and said top portion of said middle cyclone interconnected, and said top portion of said middle cyclone and said top portion of said top cyclone interconnected, said heated gas being transported to said top portion of said bottom cyclone and from said top portion of said bottom cyclone to said top portion of said middle cyclone and from said top portion of said middle cyclone to said top portion of said top cyclone, and said sorbent particles being transported to said top portion of said top cyclone in which top cyclone said sorbent particles are contacted by said heated gas to at least partially remove said nitrogen oxides from said sorbent particles and to at least partially separate said heated gas and said sorbent particles, and said sorbent particles exiting said bottom portion of said top cyclone and being transported to said top portion of said middle cyclone by said heated gas and said sorbent particles being contacted in said middle cyclone by said heated gas to further at least partially remove said nitrogen oxides from said sorbent particles and to at least further substantially separate said sorbent particles from said heated gas and said sorbent particles exiting said bottom portion of said middle cyclone and being transported to said top portion of said bottom cyclone by said heated gas and in which bottom cyclone said sorbent particles are further contacted by said heated gas to further substantially remove said nitrogen oxides from said sorbent particles and to further substantially separate said sorbent particles from said heated gas; and said second desorber comprising a plurality of interconnected cyclones includes top, middle and bottom cyclones, each cyclone having a top and bottom portion, said bottom portion of said middle cyclone and said top portion of said bottom cyclone interconnected, said top portion of said bottom cyclone and said bottom portion of said top cyclone and said top portion of said middle cyclone interconnected, said top portion of said middle cyclone and said top portion of said top cyclone interconnected said cooling gas being transported to said top portion of said bottom cyclone and from said top portion of said bottom cyclone to said top portion of said middle cyclone and from said top portion of said middle cyclone to said top portion of said top cyclone and said sorbent particles being transported to said top portion of said top cyclone in which top cyclone said sorbent particles are contacted by said cooling gas to at least partially cool said sorbent particles and to at least partially separate said cooling gas and said sorbent particles, and said sorbent particles exiting said bottom portion of said top cyclone and being transported to said top portion of said middle cyclone by said cooling gas and said sorbent particles being contacted in said middle cyclone by said cooling gas to further at least partially cool said sorbent particles and to at least further substantially separate said sorbent particles from said cooling gas and said sorbent particles exiting said bottom portion of said middle cyclone and being transported to said top portion of said bottom cyclone by said cooling gas and in which bottom cyclone said sorbent particles are further contacted by said cooling gas to further substantially cool said sorbent particles and to further substantially separate said sorbent from said cooling gas.

17. The apparatus according to claim 16 wherein said transport line adsorber has a length providing sufficient residence time of said sorbent particles therein for said sorbent particles to substantially adsorb said nitrogen oxides and said sulfur oxides from said flue gas during the time said sorbent particles are transported through said transport line adsorber by said pressurized flue gas.

18. Apparatus for utilizing sorbent particles to adsorb and remove nitrogen oxides and sulfur oxides from flue gas, comprising:

entrained flow adsorber means for receiving said sorbent particles and said flue gas and for entraining said particles in said flue gas to expose said particles to said flue gas and to cause said sorbent particles to adsorb and substantially remove said oxides from said flue gas, said adsorber means having an input means for receiving said sorbent particles and said flue gas and output means through which said flue gas and said sorbent particles having said oxides adsorbed thereto exit;

gas-solid separator means for receiving said flue gas and said sorbent particles having said oxides adsorbed thereto and for separating said gas and said particles having said oxides adsorbed thereto into a stream of flue gas having said oxides substantially removed therefrom and a stream of sorbent particles having said oxides adsorbed thereto, said gas-solid separator means having input means connected to the output means of said adsorber means, having first output means through which said stream flue gas having said oxides substantially removed therefrom exit and second output means through which said stream of sorbent particles having said oxides adsorbed thereto exit;

sorbent particle stream splitter means for receiving said stream of sorbent particles having said oxides adsorbed thereto and for dividing said stream into first and second streams of sorbent particles having said oxides adhered thereto, said particle stream splitter means having input means connected to the output means of said gas-solid separator means and having two output means, said first stream of sorbent particles having said oxides adhered thereto exiting said first output means and said second stream of sorbent particles having said oxides adhered thereto exiting said second output means;

first regenerator means for receiving said first stream of sorbent particles having said oxides adhered thereto and for removing said nitrogen oxides therefrom, said first regenerating means having input means connected to said first output means of said particle stream splitter means and having output means;

second regenerator means for receiving said first stream of sorbent particles having said sulfur oxides adsorbed thereto and said nitrogen oxides removed therefrom and for removing said sulfur oxides from said first stream of sorbent particles, said second regenerator having input means connected to said output means of said first regenerator and having output means connected to said input means of said adsorber means; and connecting means interconnecting said second output means of said particle stream splitter means to said input means of said adsorber means to cause said second stream of sorbent particles having said oxides adhered thereto to enter said input means of said adsorber means.

19. The apparatus according to claim 18 wherein said entrained flow adsorber means comprise a hollow generally cylindrical and generally vertically oriented transport line adsorber.

20. The apparatus according to claim 18 wherein said entrained flow adsorber means comprise a cyclone reactor.

21. The apparatus according to claim 18 wherein said entrained flow adsorber means comprise a gas suspension adsorber.

22. Apparatus for utilizing cooled regenerated sorbent particles to substantially remove nitrogen oxides and sulfur oxides from pressurized flue gas, said sorbent particles of an average size in the range of about 30 to about 500 microns, comprising:

a transport line adsorber for utilizing said pressurized flue gas to transport said sorbent particles to cause said sorbent particles to substantially adsorb said nitrogen oxides and said sulfur oxides from said flue gas while being transported through said transport line adsorber, upon said sorbent particles adsorbing said nitrogen oxides and said sulfur oxides said sorbent particles becoming saturated sorbent particles;

separating means for separating said saturated sorbent particles from said flue gas to provide a stream of substantially nitrogen oxide and sulfur oxide free flue gas;

a source of heated gas;

means for passing at least some of said saturated sorbent particles and said heated gas through means for recovering nitrogen oxides whereby said sorbent particles are heated to remove therefrom said nitrogen oxides and through a means for separating said sorbent and said removed nitrogen oxides so as to produce an off gas stream of heated gas carrying away said nitrogen oxides;

a source of regenerant gas for contacting said heated sorbent with regenerant gas to substantially remove said sulfur oxides from said sorbent particles and to produce heated regenerated sorbent and an off gas stream of regenerant gas carrying away said sulfur oxides removed from said heated regenerated sorbent;

a source of cooling gas;

cooling means for cooling said heated regenerated sorbent with said cooling gas to cool said sorbent particles and separate said sorbent particles from said cooling gas to produce cooled regenerated sorbent; and means for returning said cooled regenerated sorbent to said transport line adsorber for repeated removal of said nitrogen oxides and said sulfur oxides from said pressurized flue gas.

* * * * *